G. V. CHENEY.
DIFFERENTIAL GEARING FOR ROVING, SPINNING, OR SIMILAR MACHINES.
APPLICATION FILED MAY 10, 1920.

1,368,114.

Patented Feb. 8, 1921.
2 SHEETS—SHEET 2.

Inventor
Geo. V. Cheney.

Witness

By
Attorney

UNITED STATES PATENT OFFICE.

GEORGE V. CHENEY, OF NORTH KENNEBUNKPORT, MAINE.

DIFFERENTIAL GEARING FOR ROVING, SPINNING, OR SIMILAR MACHINES.

1,368,114.     Specification of Letters Patent.     Patented Feb. 8, 1921.

Application filed May 10, 1920. Serial No. 380,165.

*To all whom it may concern:*

Be it known that I, GEORGE V. CHENEY, a citizen of the United States, residing at North Kennebunkport, in the county of York and State of Maine, have invented new and useful Improvements in Differential Gearing for Roving, Spinning, or Similar Machines, of which the following is a specification.

My invention relates to improvements in differential gearing for roving, spinning and similar machines, and the primary object of the invention is to provide novel and improved means for reducing the wear and tear upon the differential gears and prolonging their period of usefulness, and also for efficiently lubricating the gears and preventing the bearing surfaces from running dry.

The invention consists of the features of construction, combination and arrangement of parts, hereinafter fully described and claimed, reference being had to the accompanying drawings, in which:

Fig. 3 is a vertical transverse section on line 3—3 of Fig. 2.

Figure 1:
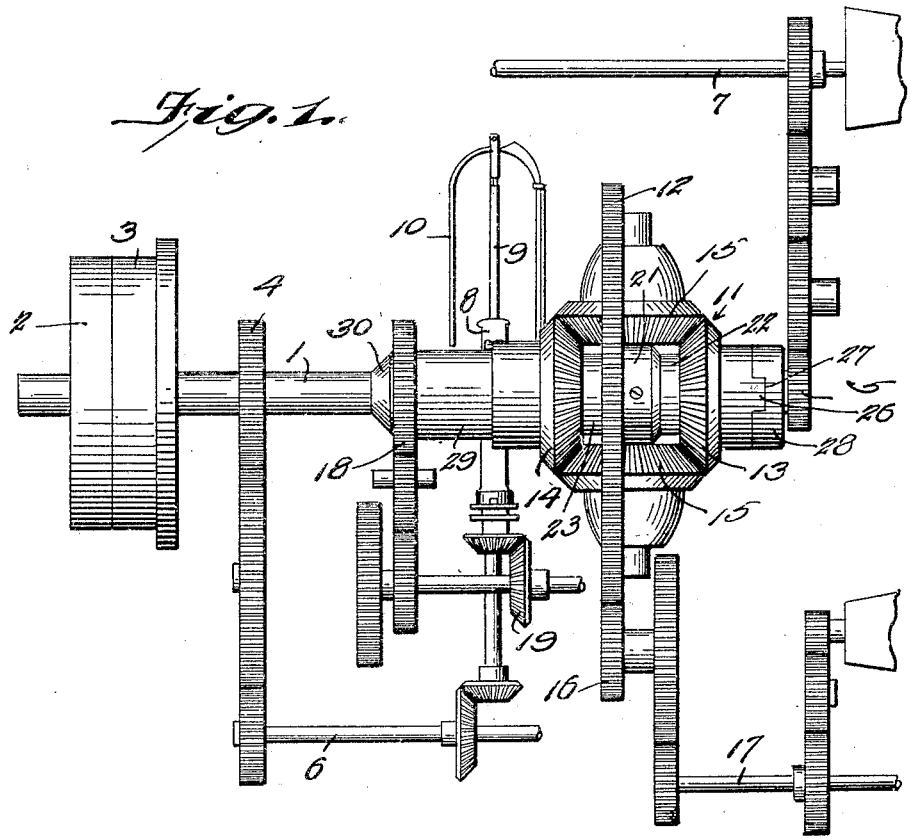
Figure 1 is a diagrammatic view showing the application of the invention to the general gearing of a machine of the character described.
Figure 2:
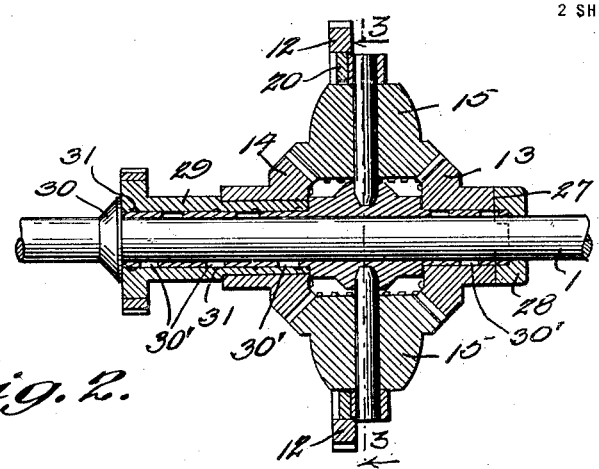
Fig. 2 is a vertical longitudinal section through the differential gearing, taken on the line of the main drive shaft.
Figure 4:
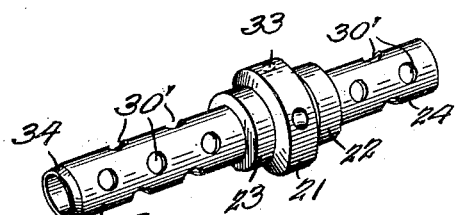
Fig. 4 is a perspective view of the hub of the sun wheel.
Figure 5:
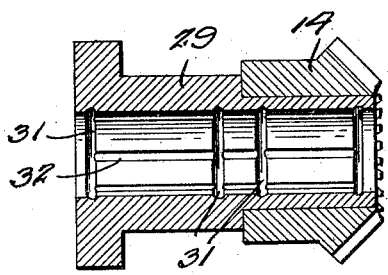
Fig. 5 is a longitudinal section on an enlarged scale through the loose drive gear of the differential.
Figure 6:
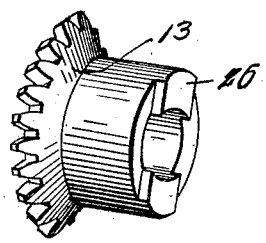
Figs. 6 and 7 are detail perspective views of the fixed differential gear and its clutch collar.
Figure 7:
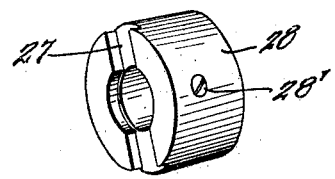

Referring now more particularly to the drawings wherein, for purposes of exemplification, I have shown the application of the invention to the general gearing for intermediates and fly frames of a roving machine, 1 designates the main drive shaft carrying the fast and loose pulleys 2 and 3, 4 and 5 the fixed gears on said shaft 1 for respectively driving the spindle shaft 6 and upper cone shaft 7, 8 the bobbin, 9 the spindle, 10 the flyer arms, and 11 the differential gear generally, said differential gear including the sun wheel 12, fixed bevel gear 13, loose driving bevel gear 14 and intermediate bevel gears 15. As shown, the sun wheel 12 connects, through gear 16, with the change-speed shaft 17, and the gear 14 carries a gear 18 which, through gear 19, drives the bobbin 8.

The sun wheel 12 includes a spider or frame portion 20 which is integral with or suitably fixed to a hub 21 journaled upon the main shaft 1. This hub is provided with stop shoulders 22 and 23 and sleeve extensions 24 and 25 projecting beyond the respective shoulders. The sleeve extension 24 is comparatively short and forms a support for the fixed bevel gear 13 of the differential gearing, which gear contacts at its inner end with the shoulder 22 and has its sleeve portion provided with clutch projections 26 engaging clutch recesses 27 in a fastening collar 28 fixed to the shaft 1 by a removable pin or key 28', whereby said gear 13 is rigidly connected with the shaft 1 for rotation therewith. The gear 13 is thus centered and supported with relation to the gears 15 and by contact with the shoulder 22 is maintained in perfect driving engagement with said gears 15.

The sleeve extension 25 is relatively longer than the sleeve extension 24 and forms a bearing support for the loose bevel gear 14 of the differential gearing, which loose bevel gear contacts at its inner end with the shoulder 23 and is provided with an elongated sleeve member 29 which bears at its outer end against a shoulder or abutment 30 on the shaft 1. The gear 14 and its sleeve 29 is revoluble independently upon and with the sleeve extension 25 of the differential gearing and is properly supported and centered by said sleeve extension with relation to the intermediate bevel gears 15, for accurate meshing engagement with said gears 15.

It will be understood that the differential gearing 11 operates, in the usual manner, to transmit motion to the coöperating parts of the roving and spinning or other machine to which it is applied. In the use of an ordinary differential gearing, in which the gear elements thereof are directly mounted upon the driving shaft 1, or supported upon a sleeve carried by said shaft, irregularities in the intermeshing action of the gears of the differential occur through the fact that the fixed and loose gears thereof are not generally or properly centered and supported in relation to the sun gear and intermediate gears. As a result, the weight of the parts of the differential gearing causes an unbalanced action and unequal wear and tear upon the gears 13 and 14, particularly the gear 13 on account of the greater portion of the sun gear and its parts bearing thereon, whereby the elements of the differential gearing are unduly and unequally worn within a comparatively short space of time, causing an irregular action of the gearing and necessitating frequent repairs and replacements. The improvements constituting my present invention overcome these objections, as by the use of the sleeve extensions 24 and 25 and the described mode of mounting the parts of the differential gearing, all the gears are supported directly by and from the hub of the sun wheel of the differential gearing, and are thereby at all times centered and maintained in perfect meshing engagement, the wear and tear thereon being thereby reduced and equalized and the gearing consequently maintained for a longer period in condition for efficient use and for perfect differential action.

In order to insure proper lubrication of the internal surfaces of the gearing, I provide the sleeve extensions 24 and 25 with openings 30 at proper intervals for the distribution of oil or other lubricant between the surfaces of the same, the shaft 1 and the gears 13 and 14. I also provide means for more reliable and efficient distribution of the lubricant to and between the surfaces of the sleeve extension 25, and the gear 14 and its sleeve member 29 carrying the gear 18. To this end the interior of the gear 14 and sleeve member 29 are provided with series of annular grooves 31 and longitudinal grooves 32 intersecting said annular grooves, whereby, in the motion of the gearing, the lubricant will be distributed longitudinally of and around the bearing surfaces. It will of course be understood that oil will be distributed to parts of the gearing through a suitable lubricating connection 33, which may be an oil inlet through which the gearing may be lubricated from time to time, or a cup arranged for the automatic supply of lubricant as required. The outer end of the sleeve extension 25 is preferably beveled or tapered, as indicated at 34, in proximity to the outer annular groove 31 of the sleeve member 29, thus providing for the efficient distribution of the lubricant to the face of the shoulder 30 against which the adjacent parts of the bearing elements bear.

I am aware of the fact that it has heretofore been proposed to use sleeves or bushings between the differential gearing and the drive shaft, in an attempt to overcome the disadvantages noted, but these are unreliable and inefficient for the reason that, being independent of the differential gear mechanism, they fail to mutually support and center the gears, are liable to shift and wear unequally, and increase the expense of construction and installation and cause a great deal of trouble in maintaining the parts in working condition. By my construction all these objections are overcome in a simple, reliable and efficient manner, more efficient action of the gearing secured, and the period of usefulness of the gearing prolonged, thus saving the time, labor and expense of shutting down the machine for repairs or replacements.

Having thus fully described my invention, I claim:

1. In a differential gearing for roving, spinning and similar machines, the combination, with a drive shaft, of a differential gearing mounted thereon and comprising a sun wheel having a hub provided with sleeve extensions, said hub and sleeve extensions being journaled on the drive shaft, intermediate gears carried by and rotatable with the sun wheel, a fixed gear fast to the drive shaft and supported on one of said sleeve extensions, and a loose gear supported by and journaled for rotation on and with the other sleeve extension, said fixed and loose gears being centered by said sleeve extensions so as to be mutually supported by the hub and centered in meshing relationship with the intermediate gears.

2. In a differential gearing for roving, spinning and similar machines, the combination, with a drive shaft, of a differential gearing mounted thereon and comprising a sun wheel having a hub provided with sleeve extensions, said hub and sleeve extensions being journaled on the drive shaft, intermediate gears carried by and rotatable with the sun wheel, a fixed gear fast to the drive shaft and supported on one of said sleeve extensions, and a loose gear supported by and journaled for rotation on and with the other sleeve extension, said sleeve extensions being provided with openings for transmission of lubricant to the bearing surfaces of the hub, sleeve extensions and shaft.

3. In a differential gearing for roving, spinning and similar machines, the combination, with a drive shaft, of a differential gearing mounted thereon and comprising a sun wheel having a hub provided with sleeve extensions, said hub and sleeve extensions being journaled on the drive shaft, intermediate gears carried by and rotatable with the sun wheel, a fixed gear fast to the drive shaft and supported on one of said sleeve extensions, a loose gear supported by and journaled for rotation on and with the other sleeve extension, said sleeve extensions being provided with openings for transmission of lubricant to the bearing surfaces of the hub, sleeve extensions and shaft, and a sleeve member carried by the loose gear and provided upon the interior thereof with annular and longitudinal oil distributing grooves coöperating with said openings.

In testimony whereof I affix my signature.

GEORGE V. CHENEY.